July 18, 1950 K. H. STUCK ET AL 2,515,744
JACK
Filed March 18, 1946
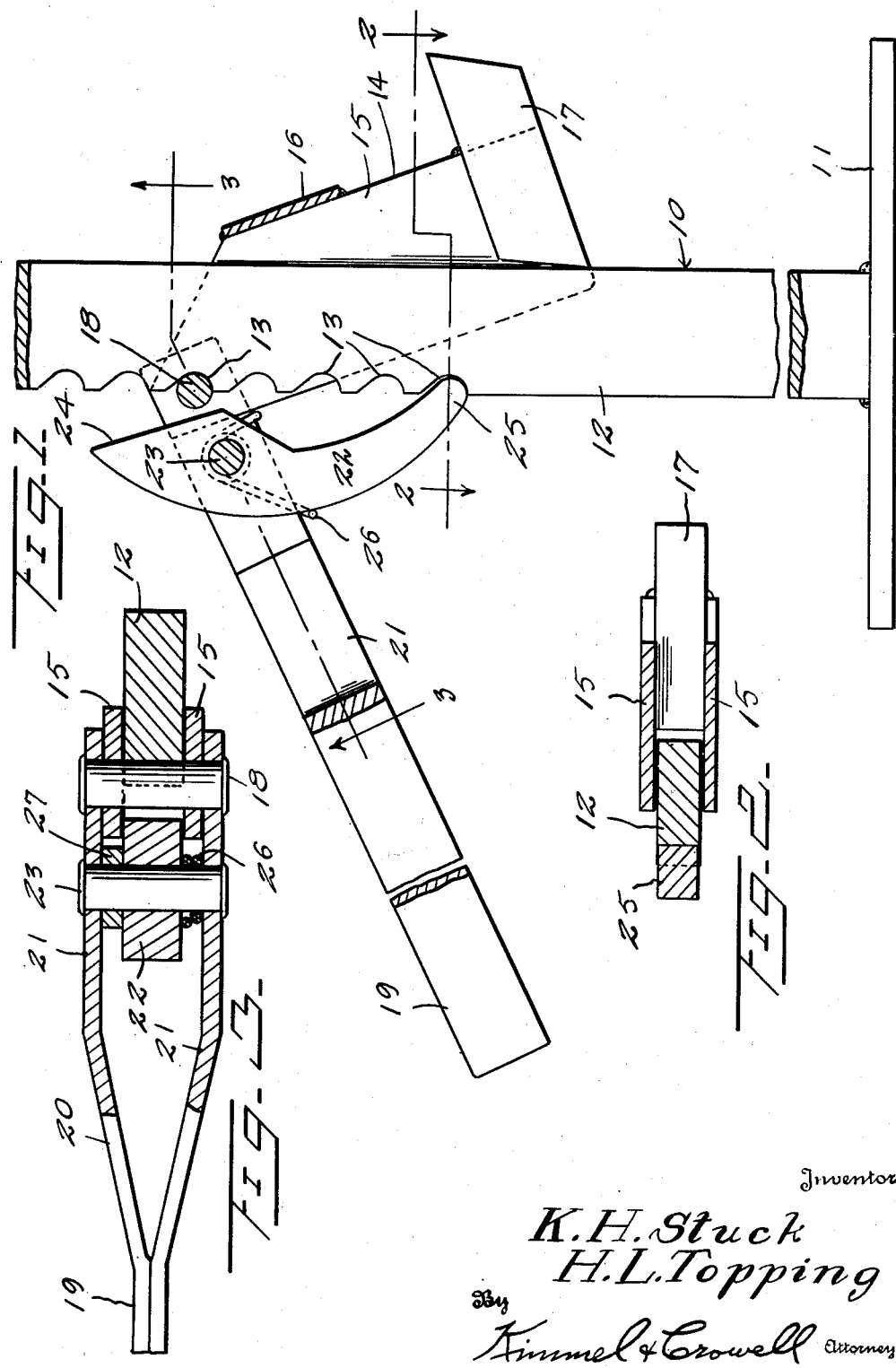
Inventors
K. H. Stuck
H. L. Topping
By
Kimmel & Crowell Attorneys Patented July 18, 1950

2,515,744

UNITED STATES PATENT OFFICE 2,515,744

JACK

Kenneth H. Stuck, Buckroe Beach, and Hunter L. Topping, Portsmouth, Va.

Application March 18, 1946, Serial No. 655,178

6 Claims. (Cl. 254—108)

This invention relates to a jack and more particularly adopted for lifting a car by engagement with the bumper.

It is an object of this invention to provide a bumper jack having a lever which travels upwardly on the jack during the upward travel and a pawl so constructed that in certain positions of the handle the pawl locks the handle on the jack and in other positions of the handle the pawl disengages and unlocks the handle.

Another object of this invention is to provide an efficient jack having very few working parts so that a great amount of efficiency can be obtained while providing few parts to give trouble and break on the jack.

Still another object of this invention is to provide an efficient, reliable jack which is very simple in construction and may be manufactured at a low cost.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary side elevation, partly broken away and partly in section, of a jack constructed according to an embodiment of my invention.

Figure 2 is a horizontal section taken on the line 2—2 of Figure 1.

Figure 3 is a horizontal section taken on the line 3—3 of Figure 1.

Referring to the drawings, the numeral 10 designates generally a jack for an automobile bumper, mounted on a base 11.

The jack standard is formed by a vertical rack 12 which engages the base 11. The rack 12 may be fastened to the base 11 by welding or other suitable fastening means, or may simply rest on the base in any conventional manner.

The rack 12 is formed of an elongated rectangular metal bar having along one edge a series of notches 13 which extend to the top of the rack 12. The notches 13 are substantially semicircular having an upwardly tapered side.

A sleeve 14 is slidable on the rack 12. The sleeve 14 is formed of two flat metal sides 15 and a metal strip 16 joining the sides near the upper end of the forward edge of the sides 15. This sleeve 14 may be built up as shown in the drawings by piecing the sides together or may be formed from a simple piece of metal so formed. The hook 17 is secured between the sides 15 at their lower end by welding. The rear edge of the hook 17 slidably bears against the forward smooth side of the rack 12. At the upper rear corner of the sleeve 14 a pin 18 is secured between the sides 15 and is engageable in the notches 13. The sleeve 14 is so positioned on the rack 12 so that a downward force on the hook 17 firmly seats the pin 18 in the notches 13 to prevent the sleeve from sliding downwardly.

A handle 19 having a bifurcated end 20 is provided, and the arms 21 of the end 20 are rotatably attached to the pin 18.

Carried between the arms 21 is a pawl 22 which is rockably mounted on a pin 23 fixed to the arms 21. The pawl 22 is of a substantially arcuate construction having a flat portion 24 along the upper part of the forward edge. The flat surface 24 is above the pivot point 23 of the pawl 22 and the lower front edge of the pawl 22 is concave having at its lower edge a rounded end or bill 25 which is engageable in the notches 13 of the rack 12.

A spring 26 coiled about the pin 23 between one arm 21 and the pawl 22 constantly urges the pawl 22 into engagement with the rack 12, one end of the spring 26 engaging the lower edge of the arm 21 and the other end engaging the rear edge of the pawl 22. The washer or spacer 27, between pawl 22 and the other arm 21, centrally positions the pawl 22 on the pin 23.

In the use and operation of this jack 10, the sleeve 14 may be slid up the jack, by hand, until the hook 17 engages under the bumper or any other selected part of an automobile. The jack is then in a position nearly as in Figure 1. For raising the automobile, force is applied downwardly on the handle 19. The handle 19 will pivot about the pin 23 raising the sleeve 14 upwardly and the pin 18 out of one notch 13 into the next higher notch 13. Raising the lever 19 for a second stroke the handle 19 will now pivot about the pin 18 and raise the pawl 22 out of one notch 13 into a higher selected notch 13, from which the lever 19 will be supported on the next stroke to raise the automobile. When the desired height is reached the weight of the car will hold the sleeve in position with the pin 18 in a high notch 13.

For lowering the jack 10 and the car, it is necessary only to raise the handle 19 until the pin 18 and the bill 25 of the pawl 22 are both disengaged from the retaining notches 13. As the outer end of the handle 19 is raised, the handle 19 and pawl 22 will pivot upwardly about the pin 18 until the flat surface 24 of the pawl 22 is caused to engage over the notches 13 on the surface formed by the outer edges of these notches. The bill 25, being in a plane offset from that of the surface 24, will be raised from the notches 13 as the surface 24 is fully engaged over the rack 12. Further upward movement of the handle 19 will cause pin 18 to be pivoted about the pin 23 for disengaging at the same time the pin 18 and bill 25 from the rack 12. As the surface 24 is of a length greater than the distance between successive notches 13, the surface 24 will not engage in any notch but will slide over the rack 12, for lowering the jack and the car, as the sleeve is then free to slide down until it is free from the bumper.

Upward pressure on the handle 19 serves also to force the surface 24 against the notched side of the rack 12 to serve as a brake for resisting the downward force caused by the weight of the automobile.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

Having thus described our invention, what we claim is:

1. A jack comprising a base, a standard rising from said base, one side of said standard having notches thereon, a sleeve slidable on said standard, a hook fixed to the lower end of said sleeve, the rear side of said hook engaging the forward smooth side of said standard, a pin carried by said sleeve at the upper end thereof, said pin being engageable in the notches of said standard, a handle pivotally secured to said pin, and a spring pressed pawl carried by said handle, said pawl having a bill below said handle engageable with the notches of said standard in the lower position of said handle and having a flat surface above said handle for engagement with the notched side of said standard for disengaging said bill from said notches and for braking the downward travel of said sleeve.

2. A jack comprising an elongated standard, having notches on one side thereof forming a rack, a sleeve about said rack and slidable thereon, a hook carried by the lower end of said sleeve, a pin carried by the upper end of said sleeve engageable in said notches, a bifurcated handle pivotably fastened to said pin, and a spring pawl carried by said handle between the arms of the bifurcation thereof, said pawl having a bill below said handle for engagement with said notches and a flat surface above said handle for engagement over said notches for disengaging said bill.

3. A jack comprising an elongated rectangular standard having notches on one side thereof forming a vertical rack, a substantially rectangular sleeve about said rack in such a manner that the rack passes through two adjacent sides of said sleeve, a hook fixed to the lower end of said sleeve, a hook fixed to lower end of said sleeve on one side of said sleeve, a pin fixed to said sleeve at the upper end on the other side of said sleeve, a handle pivotally secured to said sleeve, said handle having a bifurcated end, the arms of said bifurcated end engageable with said pin, said pin engageable in said notches, a second pin fixed to said handle between said arms, a pawl rackably carried by said second pin, said pawl being formed with a bill below said handle for engagement in said notches and a flat surface above said handle engageable over said notches for disengaging said bill, and a spring coiled about said second pin engaging said handle and said pawl for constantly urging said bill into engagement with said notches.

4. A jack comprising a base, a rack rising from said base, a sleeve slidable on said rack, a hook on said sleeve, a pin on said sleeve engageable with said rack, a handle pivotal on said pin, and a spring-pressed pawl on said handle, a bill on said pawl below said handle engageable with said rack, and a flat surface on said pawl above said handle for sliding engagement over said rack for disengaging said bill and said pin from said rack in a raised position of said handle.

5. A jack comprising a base, a standard on said base having notches on one side thereof forming a rack, a sleeve about said rack and slidable thereon, a hook on said sleeve, a pin on said sleeve engageable in a selected one of said notches, pivotable handle connected on said pin, a spring-pressed pawl on said handle, a bill on said pawl below said handle for engagement in a selected one of said notches below said pin, and a flat surface on said pawl above said handle for sliding engagement over said rack, the plane of said flat surface being offset from said bill whereby said bill will be raised from said rack upon raising of said handle and said pin will be disengaged from said rack upon further raising of said handle to sleeve lowering position.

6. A jack comprising, an upright standard having a vertically extended rack face; a lift composed of spaced jaws which embrace the standard and are secured together and a lifting lug on one side of the standard secured to said jaws; a handle on the other side of the standard, a cross pin secured to the jaws and forming a pivotal connection between the handle and lift, a pawl pivoted to the handle and depending therefrom and whose lower end is arranged to successively engage the teeth of the rack face as the handle is reciprocated to elevate the lift, said pin being arranged to engage with the rack face to maintain the lift at any selected point of adjustment.

KENNETH H. STUCK.
HUNTER L. TOPPING.

REFERENCES CITED

The following references are of record in the file of this patent:

UNITED STATES PATENTS

| Number | Name | Date |
|---|---|---|
| 133,484 | Randall | Nov. 26, 1872 |